(12) United States Patent
Reichle et al.

(10) Patent No.: US 10,990,244 B2
(45) Date of Patent: Apr. 27, 2021

(54) NAVIGATION APPARATUS AND METHOD FOR DISPLAYING A NAVIGATION TREE ON A DISPLAY UNIT

(71) Applicant: SEW-EURODRIVE GMBH & CO. KG, Bruchsal (DE)

(72) Inventors: Robert Reichle, Stutensee (DE); Manfred Gaul, Kronau (DE); Stephan Nicklis, Ober-Ramstadt (DE); Christian Hornung, Muggensturm (DE); Desiree Nissel, Oberhausen-Reinhausen (DE); Stephan Schneider, Bruchsal (DE); Rima Pfetzing, Bruchsal (DE); Anne Schilling, Karlsruhe (DE); Daniel Reinhardt, Weil der Stadt (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 201 days.

(21) Appl. No.: 15/107,081

(22) PCT Filed: Dec. 18, 2014

(86) PCT No.: PCT/EP2014/003433
§ 371 (c)(1),
(2) Date: Jun. 21, 2016

(87) PCT Pub. No.: WO2015/096898
PCT Pub. Date: Jul. 2, 2015

(65) Prior Publication Data
US 2017/0046018 A1 Feb. 16, 2017

(30) Foreign Application Priority Data

Dec. 23, 2013 (DE) ...................... 10 2013 021 791.1
May 9, 2014 (DE) ...................... 10 2014 006 700.9

(51) Int. Cl.
*G06F 3/0482* (2013.01)
*G06F 16/901* (2019.01)
(Continued)

(52) U.S. Cl.
CPC .......... *G06F 3/0482* (2013.01); *G05B 19/00* (2013.01); *G06F 3/0481* (2013.01);
(Continued)

(58) Field of Classification Search
CPC .. G06F 3/04842; G06F 3/0485; G06F 3/0481; G06F 17/2247; G06F 17/2241; G06F 17/30961; G06F 17/30991
See application file for complete search history.

(56) References Cited

U.S. PATENT DOCUMENTS 6,380,957 B1 *   4/2002   Banning ............... G06F 3/0481
                                                    715/825
2003/0202019 A1 * 10/2003   Detweiler ............ G06F 3/0482
                                                    715/853
(Continued)

FOREIGN PATENT DOCUMENTS

DE          101 17 030      10/2002
DE     10 2012 208 457      11/2013

OTHER PUBLICATIONS

International Preliminary Report on Patentability and Written Opinion issued in corresponding International Application No. PCT/EP2014/003433, dated Jul. 13, 2016.
(Continued)

*Primary Examiner* — Seth A Silverman
(74) *Attorney, Agent, or Firm* — Carter Deluca & Farrell LLP

(57) ABSTRACT

A navigation apparatus displays nodes of a navigation tree stored in a storage device in a manner that one selected node is displayed in an expanded display form and further nodes
(Continued)

are displayed in a reduced display form on a display unit. In response to a selection of a subordinate node, the previously selected node is converted into the reduced display form and the newly selected node is converted into an expanded display form.

15 Claims, 7 Drawing Sheets

(51) Int. Cl.
| | |
|---|---|
| G06F 16/9038 | (2019.01) |
| G06F 3/0481 | (2013.01) |
| G05B 19/00 | (2006.01) |
| G06Q 10/06 | (2012.01) |
| G06F 16/904 | (2019.01) |
| G06F 40/14 | (2020.01) |
| G06F 40/137 | (2020.01) |
| G06F 3/0485 | (2013.01) |

(52) U.S. Cl.
CPC .......... *G06F 3/0485* (2013.01); *G06F 16/904* (2019.01); *G06F 16/9027* (2019.01); *G06F 16/9038* (2019.01); *G06F 40/137* (2020.01); *G06F 40/14* (2020.01); *G06Q 10/06* (2013.01)

(56) References Cited

U.S. PATENT DOCUMENTS

| | | | |
|---|---|---|---|
| 2005/0076309 A1* | 4/2005 | Goldsmith | G06F 3/0482 715/811 |
| 2006/0085435 A1* | 4/2006 | Farn | G06F 16/9027 |
| 2008/0288514 A1* | 11/2008 | Chari | G06F 17/30941 |
| 2009/0013271 A1* | 1/2009 | Heitman | G06F 17/30572 715/764 |
| 2009/0187864 A1* | 7/2009 | Bedell | G06F 3/04817 715/854 |
| 2011/0148878 A1* | 6/2011 | Baikie | G06T 11/206 345/440 |
| 2012/0030631 A1* | 2/2012 | Gonzalez | G06F 9/451 715/854 |
| 2014/0143734 A1* | 5/2014 | Jann | G06Q 10/067 715/853 |

OTHER PUBLICATIONS

International Search Report, dated Apr. 21, 2015, issued in corresponding International Application No. PCT/EP2014/003443.
Office Action issued in European Patent Application No. 14825099.6, dated Oct. 8, 2019.
European Office Action mailed from the European Patent Office and issued to counterpart Application No. 14825099.6 dated Apr. 8, 2020, 6 pages.

\* cited by examiner

NAVIGATION APPARATUS AND METHOD FOR DISPLAYING A NAVIGATION TREE ON A DISPLAY UNIT

FIELD OF THE INVENTION

The present invention relates to a navigation apparatus and a method for displaying a navigation tree on a display unit.

BACKGROUND INFORMATION

Such apparatuses and methods are known in a variety of forms, e.g., from the program. "Windows Explorer" of the firm Microsoft.

The challenge especially in the case of extensive navigation trees is to permit navigation in the navigation tree without a user losing the overall view because of the abundance of information.

SUMMARY

Example embodiments of the present invention provide a navigation apparatus which, aided by computer, permits easy, lucid navigation in a complex navigation tree.

According to an example embodiment of the present invention, a navigation apparatus includes a storage device in which a navigation tree having nodes is stored, the nodes being interconnected via directional links, the directional links defining an order structure which characterizes superordinate nodes and subordinate nodes for each node, includes a display unit on which the nodes are displayable at least in an expanded display form and a reduced display form, and includes an input device by which the nodes are selectable individually, a control unit of the display unit being provided which triggers a conversion of a node into the expanded display form in response to selection of this node. The control unit is equipped for an automatic conversion, triggered by the selection, of a node superordinate to this selected node, into the reduced display form. An advantage is that information is able to be reduced with computer assistance, e.g., automatically, in the branches of the navigation tree not needed in the current navigation. In this manner, exactly the information which he needs at the moment is displayed to a user. Preferably, the superordinate node mentioned is a node previously selected. It is therefore possible to change, by selection, from one node to the next node, the previously selected node being transferred into the reduced display form.

Upon a conversion into the reduced display form, the control unit may be equipped to reduce the links, displayed on the display unit with respect to one node, to nodes directly subordinate to this node. An advantage is that links to nodes which are not of interest during the present navigation are reducible, for example, are able to be hidden completely. Consequently, the navigation tree is able to be simplified for display on the display unit by hiding information not needed at the moment.

The control unit may be equipped to select all links, linked to a selected node, to directly subordinate nodes and to display the selection on the display unit. An advantage in this case is that all possibilities of climbing one level lower in the navigation tree are displayable to the user. A further advantage is that every subordinate node is directly selectable with one click.

The navigation tree may have a start node for which no superordinate node exists, and for each node of the navigation tree, the order structure may determine a succession of links via which this node is connected to the start node. An advantage is that a beginning of the navigation tree and a start of a navigation process are definable. Advantageously, at the same time, it is automatically ensured that each node is connected via at least one succession of links to every other node of the navigation tree. The navigation tree is preferably structured such that each node is connected via exactly one succession of links to each further node of the navigation tree. In this case, for example, no closed paths are present.

A succession of links, e.g., the succession of links already mentioned, together with their associated nodes, may define a navigation path, and the control unit may be equipped to display the nodes of the navigation path which are superordinate to a selected node, on the display unit. An advantage is that a connection to a start node is able to be displayed. Thus, the instantaneous position in the navigation tree is displayable in a manner easily discernible for the user, by displaying a (shortest) connection to the start node on the display unit.

In this context, the control unit may be adapted to hide subordinate nodes that are subordinate to an unselected node of the navigation path and do not belong to the navigation path. An advantage in so doing is that a simplified navigation path is displayable. Alternatively or additionally, the control unit is set up to hide links from unselected nodes of the navigation path to subordinate nodes that do not belong to the navigation path. This is considered advantageous because it creates a further possibility to reduce information for a more easily discernible display of the navigation path.

In general, the control unit may be arranged such that exactly one node is always displayed as selected node at each instant.

The control unit may be equipped to select nodes and links for display on the display unit in which branchings of a navigation path are eliminated, and to display the selection on the display unit. An advantage in so doing is that the navigation path is displayable without branchings. Preferably, the selection is made such that only nodes belonging to the navigation path and/or only links contained in the navigation path are selected or are selectable.

The control unit may be adapted to automatically ascertain a navigation path to a node. An advantage is that relevant information of the navigation tree is extractable in an easy manner.

The control unit may be equipped to automatically select at least one link for each node displayed, and to display the selection on the display unit. Thus, the nodes to be displayed are able to be displayed connected among each other. Links not needed for this are able to be blanked in the display, by not selecting them for the display, for example. Apart from the currently selected node, the nodes of the navigation path may be displayed in the reduced display form or in an even further information-reduced display form. For example, the control unit is equipped to select, from the quantity of links set up in the display tree, in each case one link that connects two nodes to be displayed.

The control unit may be equipped to select no more than two links for each unselected node to be displayed, the links being linked directly to the respective node, and to display the selection on the display unit. An advantage in this case is that it is simple to display a branching-free part of the navigation tree, especially the navigation path already mentioned. A direct link to a node is able to be characterized, for example, in that between the link and the node, neither a further link nor a further node is present in the navigation tree.

The input device may include a pointer, the input device being furnished to select a node by placing the pointer over the displayed node and subsequent activation. This is considered advantageous because it permits a graphically assistable navigation. For example, a mouse, a trackball, a joystick, a graphics tablet, a touch-sensitive display, etc. may be provided as an input device.

The control unit may be adapted to switch over from a standard display form for all nodes directly subordinate to one node selected and/or shown in the expanded display form, to a diminished display form when the quantity of directly subordinate nodes exceeds a threshold value. An advantage is that the display is able to be furnished in a more lucid manner. In this context, the reduced display form is distinguishable or differentiated from the standard display form, for example, by the omission of information that is stored assigned to the node.

The control unit may be equipped for a tooltip function. This offers the advantage that information which is stored with displayed nodes and/or displayed links and is not being displayed at the moment in order to reduce the amount of information, is displayable. Certain tooltip functions are conventional, e.g., the mouseover function.

In this context, the control unit may be equipped to convert a node from a diminished display form to an enlarged display form by placing a pointer, e.g., the pointer already mentioned, over the node. An advantage is that an easily manipulable process is achievable, which permits additional information in an information-reduced display of the navigation tree. In this connection, it may be provided that the enlarged display form contain at least one additional symbol assigned to the node and/or at least one piece of text information assigned to the node.

The control unit may be equipped to ascertain a depth number for the node currently selected and/or to ascertain a quantity of nodes in the navigation path displayed at the moment. In this case, the control unit preferably has a counter which is furnished to ascertain the depth number and/or the quantity, e.g., by programming. This offers the advantage that the ascertainment may be accomplished in automated fashion. Preferably, a depth number is usable which characterizes a depth of a node in the navigation path and/or in a hierarchy of the navigation tree. In this context, it is especially beneficial if the control unit converts a predefined quantity of nodes automatically to a miniaturized display form when the quantity of nodes in the navigation path displayed at the moment and/or a depth number of the currently selected node exceeds/exceed a threshold value. This is considered advantageous because the navigation path remains clearly displayable in full length, even if—e.g., with advancing depth in the navigation tree—the navigation path becomes ever longer. Thus, it is provided to present to the user the instantaneous position in the navigation tree in a more easily discernible manner at any time during navigation.

The control unit may be adapted to display the links from one node selected and/or displayed in the expanded display form, to all directly subordinate nodes, and to display these directly subordinate nodes. The control unit controls the display unit accordingly. An advantage is that the deeper situated nodes, e.g., subordinate, in the branching tree to a selected node or to a node shown in the expanded display form, are able to be displayed in order to allow the user to advance in the navigation tree. In this connection, the links may be copied by segments of the instantaneously selected node, the links ending in each case at the segments. An advantage is that groupings of the branching tree as regards content are clearly displayable.

It is especially beneficial if the subordinate nodes are disposed in a circle and/or are distributed in the circumferential direction, preferably uniformly in the circumferential direction, around the node selected and/or shown in the expanded display form. In this manner, an especially easily discernible, graphical representation is created. Instead of a circle form, other forms, e.g., hexagons or other polygons, are also describable by the arrangement of the subordinate nodes around the node selected and/or shown in the expanded display form.

The control unit may be equipped to convert the expanded display form of a node into a linear display form in which a list entry of a list is generated for each link and for each segment. This is considered advantageous because an alternative type of representation or display form is able to be made available, the user being permitted to change between the display forms according to choice.

In this context, the list entries of links assigned to one segment in each case may form a sublist. An advantage is that the graphical structuring of the branching tree is easily convertible to the linear display form with the aid of the segments.

The list entries for links between two segments may be scrollable in a first scroll mode in the case of fixed segments. This is considered advantageous because the information from the segments also remains visible when scrolling the list entries for the links. In this context, it is especially beneficial if a sublist, e.g., the sublist already mentioned, of list entries is scrollable in the first scroll mode. Thus, only the list entries which are assigned to a single segment are scrollable. Preferably, a further criterion is provided which, if satisfied, there is a change back to the first scroll mode, e.g., for the following sublist.

The sublist of the list entries for links may be scrollable with at least one adjacent list entry for a segment in a second scroll mode. An advantage is that scrolling is feasible in the entire list, as the sublist is scrollable together with the adjacent list entry for a segment.

A scroll-mode switchover unit may be provided, which checks whether an end of a sublist of list entries of links is reached during scrolling, and which automatically changes from a first scroll mode, e.g., the scroll mode already mentioned, to a second scroll mode, e.g., the scroll mode already mentioned, when the result of the check is positive. An advantage is that initially, scrolling is permitted in the first scroll mode and then, without the user having to take action here, continued scrolling in the superordinate structure is made possible automatically.

In this connection, the at least one adjacent list entry for a segment may adjoin the sublist in the direction of the previous scrolling of the sublist. Advantageously, in this manner, further scrolling is easily made possible for the user, the scroll-mode switchover unit automatically bringing about a switchover as soon as the end of a sublist is reached.

According to an example embodiment of the present invention, in a method for displaying a navigation tree on a display unit—the navigation tree having nodes that are interlinked via directional links, the directional links defining an order structure which characterizes superordinate nodes and subordinate nodes for each node, and the nodes of the navigation tree being selectable by an input device, in each case at least one expanded display form and a reduced display form being provided for displaying the nodes of the navigation tree on the display unit, the reduced display form reproducing decreased information content compared to the expanded display form, at least one superordinate node and at least one subordinate node being displayed on the display unit for a selected node, and the selection of the subordinate node triggering an automatic conversion of the subordinate node into the expanded display form—by selecting the subordinate node, an automatic conversion of the previously selected node into the reduced display form is triggered. An advantage in this case is that information content not further needed at the moment for the navigation is automatically reduced. In particular, offshoots of the navigation tree that are not connected directly to the presently selected node of the navigation tree are or remain reduced, especially hidden. The user therefore has the capability to easily recognize where he is in the navigation tree and which links are available to him from this instantaneous position. Further nodes of the navigation tree which are first reachable for the user after several steps are therefore able to be hidden in order to clearly display the navigation tree.

In the reduced display form of a node, fewer links to directly subordinate nodes may be displayed on the display unit than in the expanded display form. An advantage is that the reduction of displayed links of a node is a simple manner of increasing the clarity of a representation of a display tree. It is especially beneficial if, in the reduced display form, exactly one superordinate node and exactly one subordinate node are displayed with the associated links.

A navigation tree may have a start node for which no superordinate node exists, and for each node of the navigation tree, a succession of links may be determined, via which this node is connected to the start node. An advantage is that a start point is specifiable for navigation in the navigation tree that is easily discoverable for the user, as in each case the user selects the node superordinate to a node currently selected, until the process comes to an end. After a node is selected, preferably the navigation path is ascertained automatically for this node, for example, by following the links counter to their direction, therefore, toward the superordinate nodes, and in each instance recording the nodes thus reached.

The succession of links may define a navigation path, and the nodes of the navigation path superordinate to a selected node may be displayed on the display unit. An advantage is that the positioning of the currently selected node in the navigation tree is easily presentable to a user, without the need to display the complete navigation tree. Rather, it is sufficient to display the navigation path, e.g., the (shortest) connection between the selected node and the start node.

Nodes which are subordinate to a node displayed in the navigation path of a selected node, and which do not belong to the navigation path, and/or links to subordinate nodes which do not belong to the navigation path may be hidden. This offers the advantage that a branching-free representation of a part of the navigation tree is producible in an easy manner. At the same time, clarity is improved for the user.

For each node displayed on the display unit, at least one link linked to the node may be displayed. An advantage is that for each node, at least one path for navigation in the navigation tree is displayed for the user.

The navigation path may be shown free of branchings. This is considered advantageous because information not needed at the moment, such as branchings in the branching tree beyond the currently selected node, is able to be hidden, in order to reduce the complexity of the navigation tree.

The branching-free display may be accomplished by eliminating links in the display. In this manner, a branching-free navigation path is formable in especially easy fashion.

For each unselected node displayed on the display unit, no more than two links directly linked to the node may be displayed. An advantage is that further links which represent branchings may easily be blanked. Thus, the complexity of the navigation tree is reducible to the information needed at the moment.

In order to select a node, a pointer of the input device may be placed over the node and subsequently activated. An advantage in this case is that a change from one selected node to another node is easily achievable. For example, a mouse click may be used for the activation.

Placement of the pointer over a node may trigger a conversion of the node into an enlarged display form. An advantage in so doing is that additional information content is displayable in the enlarged display form in order to allow the user to decide whether or not there should be a change to this node for further navigation.

A switchover may be made automatically from a standard display form for all nodes directly subordinate to one node selected and/or shown in the expanded display form, to a diminished display form when the quantity of directly subordinate nodes exceeds a threshold value. An advantage is that navigation trees having a high degree of branching are clearly displayable, as well.

A tooltip function may be provided. In this connection, a tooltip function is characterizable, for instance, as a small pop-up window in application programs which displays additional information or other alternative descriptions with respect to an element on a graphical user interface. This is considered advantageous because information which is blanked, for example, in a diminished display form, is displayable again.

The tooltip function may provide the enlarged display form already described.

A predefined quantity of nodes may be converted automatically into a miniaturized display form when the quantity of nodes in the navigation path currently displayed exceeds a threshold value. An advantage is that the navigation path may easily be kept lucid, even with progressive depth of the selected node in the navigation tree.

In this connection, depth of the selected node is understood to be its position in the navigation tree relative to the start node. In that context, progressive depth means increasing distance from the start node.

Links from one node selected and/or shown in the expanded display form, to all directly subordinate nodes, as well as these directly subordinate nodes, may be displayed. This is considered advantageous because all paths which branch off from a node selected and/or shown in the expanded display form are visible for the user.

The links may be grouped by segments of the presently selected node, the links in each case ending at these segments. An advantage is that a thematic structuring of the navigation tree is mappable.

The expanded display form of a node may be converted into a linear display form in which a list entry of a list is generated for each link and for each segment. An advantage is that an alternative display form is able to be generated, which elicits greater acceptance for certain user groups.

Preferably, the list entries are displayable as text, so that specific designations are easily discoverable for the user.

The list entries of links assigned to one segment in each case may be grouped in a sublist. An advantage in so doing is that the structuring by segments is able to be imaged in the alternative display form, Thus, the display is able to be organized clearly.

A switch may be made from a first scroll mode, in which the list entries for links between two segments is scrolled in the case of fixed segments, to a second scroll mode, in which the sublist of the list entries for links is scrolled together with at least one adjacent list entry for a segment, when a beginning or an end of a sublist of list entries of links is reached during scrolling. It is especially beneficial if the list entries between two segments are available as sublist of list entries. An advantage is that within the structuring created by the segments, the list entries are able to be scrolled separately from each other.

The at least one adjacent list entry for a segment may adjoin the sublist in the direction of the previous scrolling of the sublist. An advantage is that a scrolling movement is able to be continued upon a change from the first scroll mode to the second scroll mode.

In the enlarged display form, at least one additional symbol assigned to the node and/or at least one piece of text information assigned to the node may be made visible. An advantage is that a tooltip function or mouseover function is able to be realized.

It is especially beneficial if the previously described navigation apparatus can perform the method described herein and/or if a navigation apparatus is employed when working with the method hereof.

For an especially easily graspable display, the display forms are realized in two or three unit sizes. Thus, for example, it may be provided that the standard display form and the enlarged display form have corresponding ratios of size and/or information content. The diminished display form and the reduced display form may be identical. Finally, the diminished display form and the miniaturized display form may be identical (as size 1), while the enlarged display form, the standard display form and the reduced display form on their part may be identical (as size 2) and larger than the diminished display form and the miniaturized display form and smaller than the expanded display form (as size 3).

Further features and aspects of example embodiments of the present invention are described in more detail below with reference to the appended Figures.

DETAILED DESCRIPTION

Figure 1:
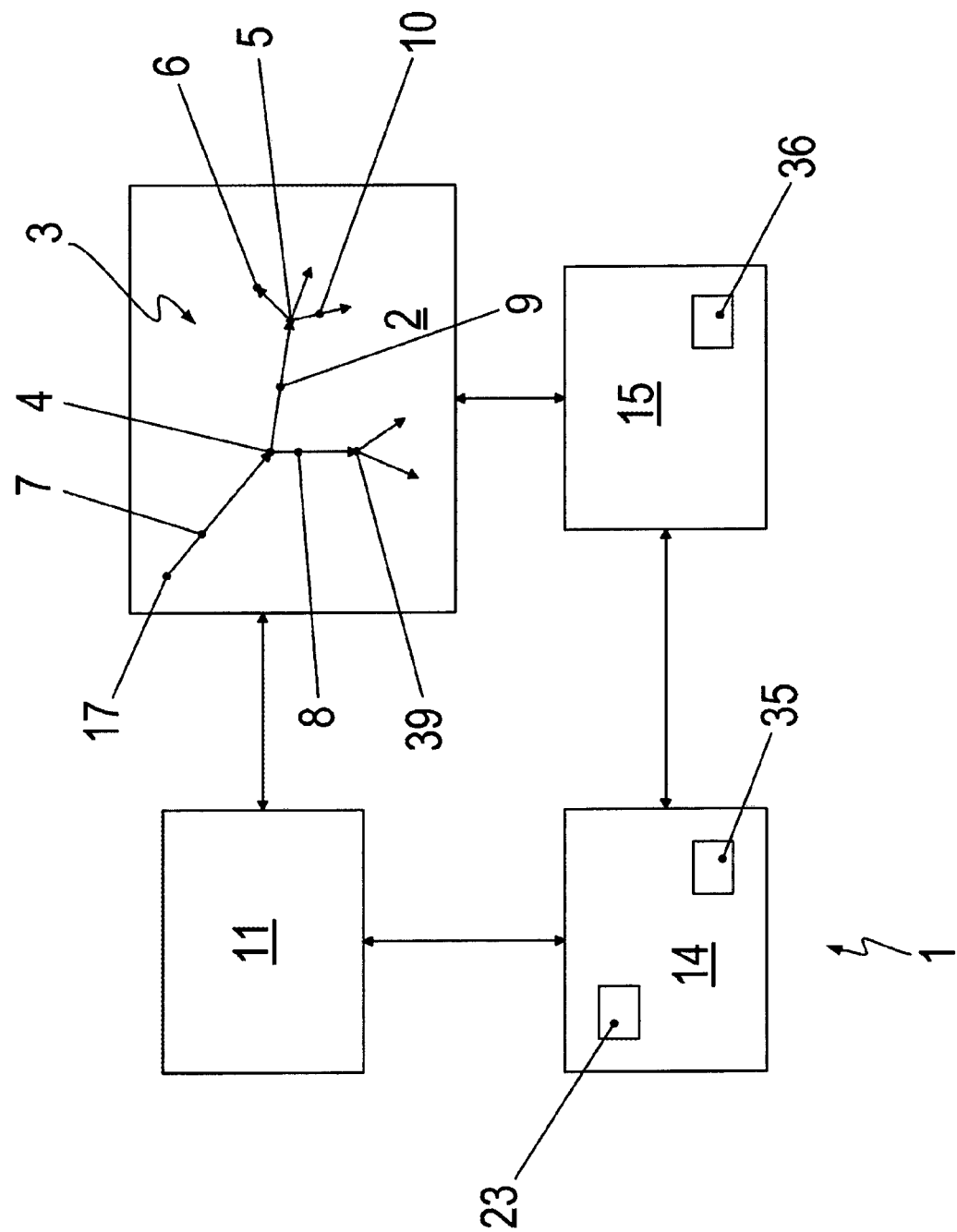
FIG. 1 shows a navigation apparatus according to an example embodiment of the present invention in a highly simplified block diagram to clarify the principle hereof.

A navigation apparatus according to an example embodiment of the present invention shown in FIG. 1 and denoted as a whole by 1 has a storage device 2.

Stored in storage device 2 is a navigation tree 3, which has nodes 4, 5, 6 and 39 that are linked to each other by directional links 7, 8, 9 and 10.

For example, navigation tree 3 images a list, a sublist being assignable to at least one list entry of the list. Each list entry corresponds to a node 4, 5, 6 and 39, and the structure connection from one list entry of the sublist to a superordinate list entry corresponds to a link 7, 8, 9 and 10.

Navigation tree 3 is shown schematically, and is actually much more complex in the case of the exemplary embodiments described. The simplification shown is intended to be used for clarify.

An order structure is defined in navigation tree 3 by the direction (here the arrows) of directional links 7, 8, 9, 10, the order structure in each case characterizing superordinate nodes and subordinate nodes for each node 4, 5, 6. For example, node 4 is superordinate to node 5, while node 6 is subordinate to node 5. Node 39 is coordinate to node 5 and subordinate to node 4.

For example, a production plant is able to be mapped with the aid of the navigation tree. In so doing, the production plant itself is representable as a start node 17. A vehicle of the production plant is representable as a node 4, 5, 6 and 39 subordinate to start node 17, and a drive of the vehicle is representable as a node 4, 5, 6 and 39 subordinate to node 4, 5, 6 and 39 of the vehicle. The start node is thus superordinate to node 4, 5, 6 and 39 of the vehicle.

Navigation apparatus 1 also has a display unit 11, with which parts of navigation tree 3 are displayable for a navigation.

For instance, a display screen or a tablet computer or a smart phone is usable as display unit 11.

Nodes 4, 5, 6 and 39 are each displayable in different display forms on display unit 11. Preferably, the various display forms have a different range of functions, e.g., command buttons and/or status indicators. The various display forms have different sizes. In this context, the range of functions of a larger display form is greater than the range of functions of a smaller display form.

Figure 3:
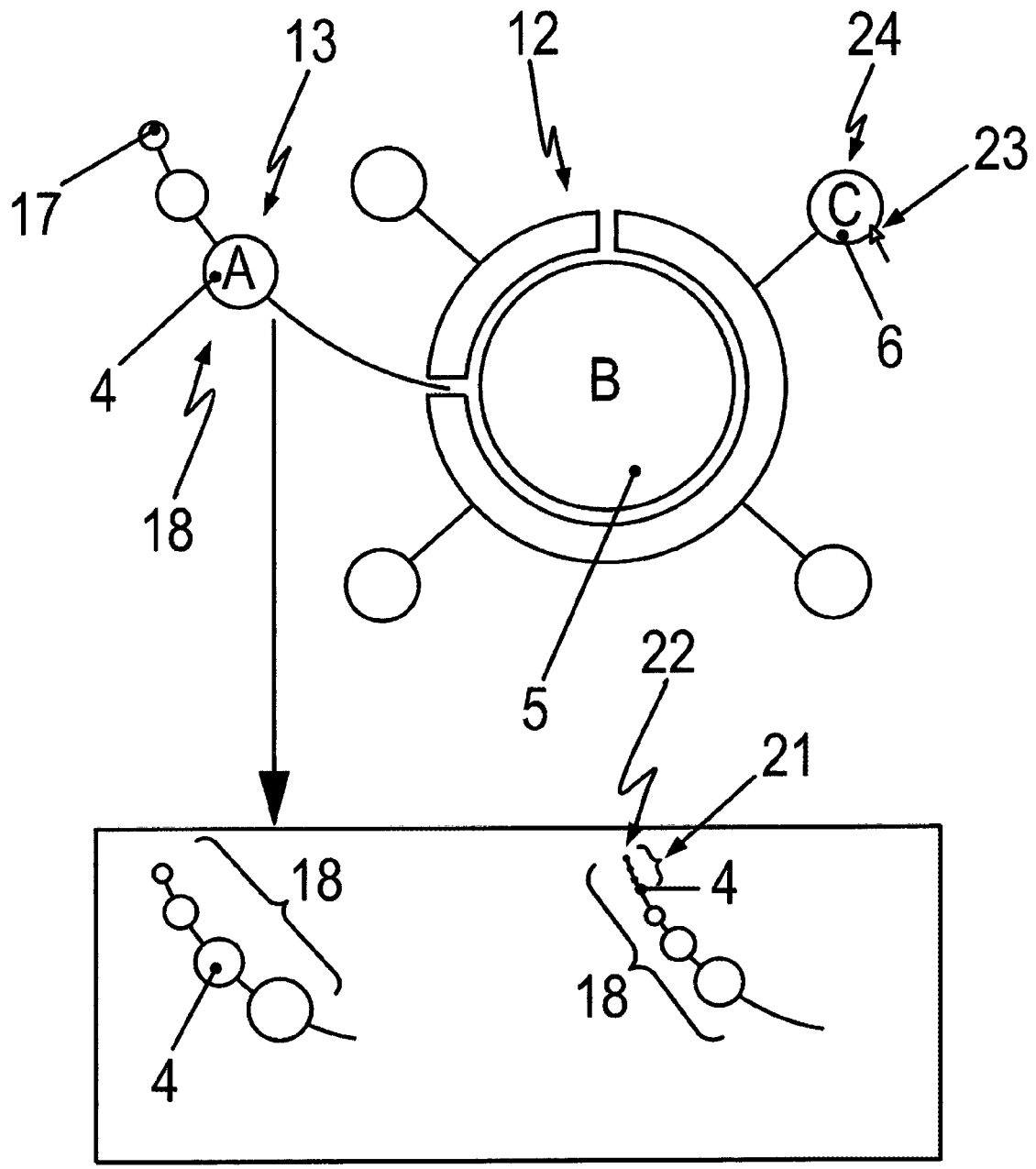
FIG. 3 shows the substep of a transition to a miniaturized display form for nodes in the navigation path in a method according to an example embodiment of the present invention for displaying a navigation tree on a display unit.

For example, FIG. 3 shows node 5 in an expanded display form 12 and node 4 in a reduced display form 13. Expanded display form 12 is preferably larger than reduced display form 13, and has a greater range of functions.

Navigation apparatus 1 also has an input device 14, with which display unit 11 and a control unit 15 are operable and manipulable. For instance, a computer mouse or a trackball or a keyboard is usable as input device 14.

Using input device 14, in particular, nodes 4, 5, 6 are selectable individually, especially clickable, e.g., by a double click.

Figure 2:
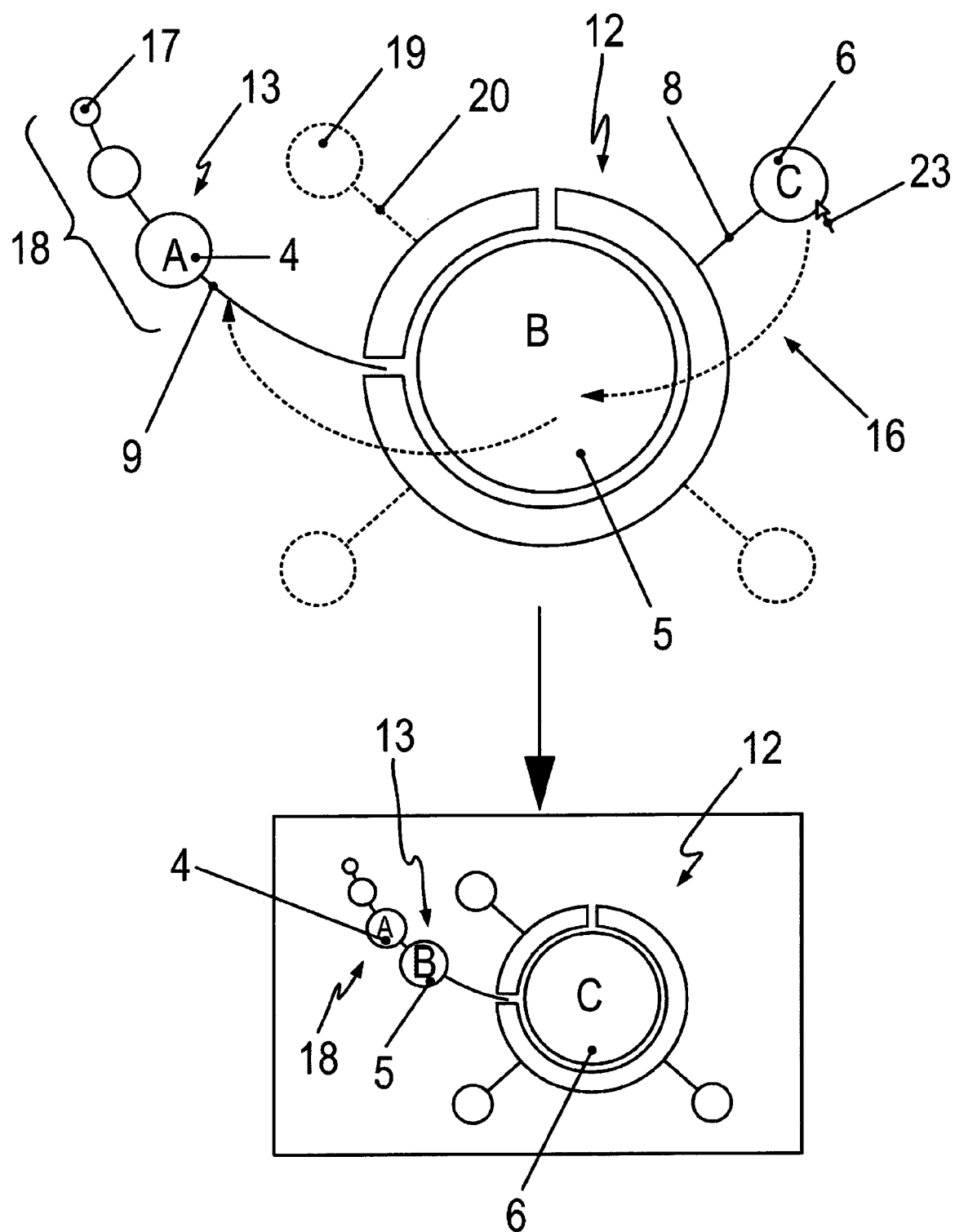
FIG. 2 shows a highly schematized, simplified representation of the substep of selecting a subordinate node in a method according to an example embodiment of the present invention for displaying a navigation tree on a display unit.

FIG. 2 shows the selection of such a node 6.

The upper part of FIG. 2 shows the situation prior to selection 16. Previously selected node 5 is shown in expanded display form 12, while superordinate node 4 is shown in reduced display form 13.

To better be able to keep track of the process, nodes 4, 5, 6 are filled illustratively with contents "A", "B" and "C", respectively. By selection 16 of subordinate node 6 using input device 14, this node 6 is converted into expanded display form 12.

This expanded display form 12 is characterized in that all directly connected links 8 of navigation tree 3 and all directly subordinate nodes 6 of navigation tree 3 are shown or displayed for respective selected node 5. By way of example, in FIG. 2, there is only one node 6 subordinate to node 5.

After selection 16, control unit 15 converts node 6 into expanded display form 12 already described.

At the same time, control unit 15 converts previously selected node 5 into reduced display form 13.

In reduced display form 13, all links and nodes which do not lead to currently selected node 5 are hidden. Thus, all nodes 6 subordinate to node 5 are shown, while node 39 subordinate to node 4 is hidden.

Therefore, in reduced display form 13 of a node 4, 5, 6, fewer links 7, 8, 9, 10 to directly subordinate nodes 4, 5, 6 are shown on display unit 11 than in expanded display form 12. On the other hand, in expanded display form 12, all nodes 4, 5, 6 directly subordinate to currently selected node 4, 5, 6 and associated links 7, 8, 9, 10 are shown on display unit 11.

In the lower half, FIG. 2 shows the representation of the part of navigation tree 3 after selection 16 of node 6 "C".

Node 6 is shown in expanded display form 12, while previously selected node 5 is converted into a reduced display form 13.

Expanded display form 12 of node 6 is produced by making further nodes 19 and further links 20 visible that belong to subordinate nodes relative to node 6. The situation in the lower image half of FIG. 2 is thus obtained.

In FIG. 2, start node 17 has no superordinate node.

Navigation tree 3 is arranged such that for each node 4, 5, 6, exactly one succession of links 7, 8, 9, 10 is determined, via which this node 4, 5, 6 is connected to start node 17.

For instance, in navigation tree 3 in FIG. 1, node 5 is connected via links 9 and 7 to start node 17.

One simple possibility for discovering start node 17 is given by following links 7, 8, 9, 10 counter to their defined direction, until no links are available for an advancement.

In this context, the defined direction of the links is that direction which points from a node 4, 5, 6, to a node 4, 5, 6 directly subordinate to this node 4, 5, 6.

The mentioned succession of links 7, 8, 9, 10 and nodes 4, 5, 6 between a selected node 5 and start node 17 forms a navigation path 18. Preferably, exactly one navigation path 18 is assigned to each node 4, 5, 6.

In the upper part of FIG. 3, nodes 4 superordinate to a selected node 5 are shown in reduced display form 13.

With progressive depth, e.g., in the defined direction of links 7, 8, 9, 10, in navigation tree 3, the quantity of nodes 4 in navigation path 18 increases. As soon as the quantity of nodes 4 in navigation path 18 exceeds a threshold value, control unit 15 converts a predefined quantity 21 of nodes 4 into a miniaturized display form 22.

To that end, control unit 15 has a counter which is equipped to ascertain a depth number for currently selected node 5, that characterizes the depth of node 5 in navigation path 18, and/or to ascertain a number of nodes 4 in navigation path 18. For example, this is achievable by programming of control unit 15.

Space is thus able to be saved on display unit 11, so that navigation path 18 remains fully displayable.

Figure 4:
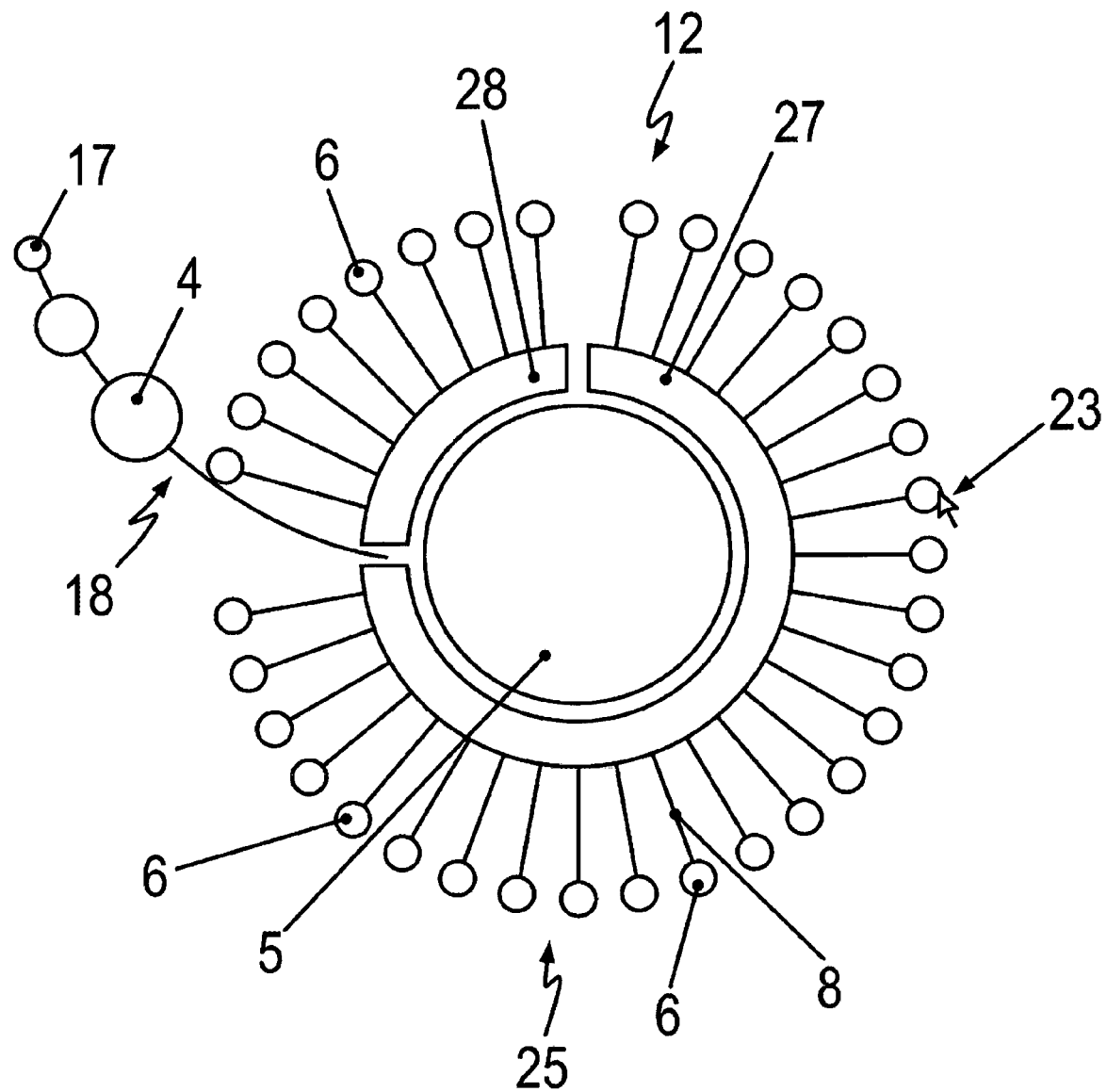
FIG. 4 shows the display of nodes subordinate to a selected node in the diminished display form in a method according to an example embodiment of the present invention.
Figure 5:
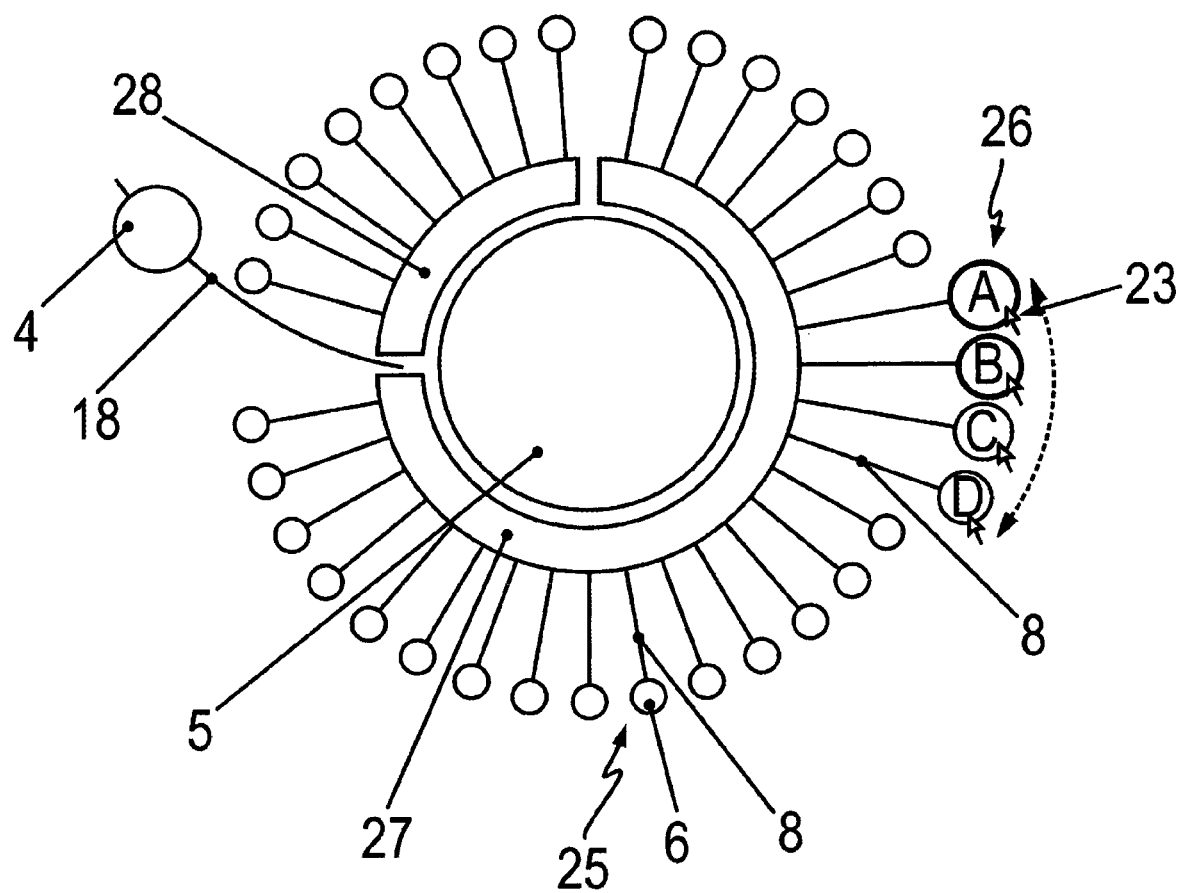
FIG. 5 shows the transition from the diminished display form to an enlarged display form upon placement of the pointer over a node in a method according to an example embodiment of the present invention.

As illustrated in FIGS. 2, 3 and 4, navigation path 18 is displayed free of branchings.

This is achieved in that control unit 15 selects nodes 4, 5, 6 and links 7, 8, 9, 10 for display on display unit 11, branchings of navigation path 18 being eliminated in the display.

Therefore, in navigation path 18, for each node 4, 5, 6, in each case exactly one link 7, 8, 9, 10 to a superordinate node 4 and exactly one link 7, 8, 9, 10 to a subordinate 6 is selected and brought to display. Control unit 15 makes this selection. Therefore, for each node 4, 5, 6, control unit 15 automatically selects exactly two links 7, 8, 9, 10 from the available links in navigation tree 18.

Selection 16 of nodes 4, 5, 6 is accomplished using a pointer 23 of input device 14. To be more precise, selection 16 of a node 6 takes place because pointer 23 is placed over node 6 and subsequently activated.

FIG. 3 shows expanded display form 12 of a node 5 with four subordinate nodes 6.

In this case, subordinate nodes 6 are shown in a standard display form 24. In this context, standard display form 24 is realizable in keeping with reduced display form 13, or differences are possible between both display forms.

FIG. 4 shows a selected node 5 in expanded display form 12, which has a multitude of subordinate nodes 6.

Therefore, control unit 15 controls display unit 11 such that subordinate nodes 6 are not shown in standard display form 24 according to FIG. 3, but rather in a diminished display form 25.

Diminished display form 25 differs from standard display form 24 because the information content is reduced once again.

Standard display form 24 differs from expanded display form 12 at least by the fact that no links are shown to subordinate nodes.

In addition, diminished display form 25 differs from standard display form 24 because no text information or symbols are contained in nodes 6 (in general, not shown here for simplification).

For example, simplified representations of drive units of a production plant or of vehicles are usable as symbols. Preferably, the usable symbols for all nodes 4, 5, 6, 19, 39 are able to be made available in one common list or database, especially preferred, in standardized form, so that the displayable symbols are easily definable and/or able to be updated.

However, such additional information is able to be made visible again using a tooltip function or mouseover function. For that purpose, pointer 23 must be placed over a subordinate node 6 in diminished display form 25. The result is that control unit 15 automatically converts node 6 in question from diminished display form 25 into an enlarged display form 26. For instance, this is standard display form 24 already mentioned.

As illustrated in the Figures, links 8 to subordinate nodes 6 in relation to a node selected and therefore displayed in expanded display form 12, come to an end at segments 27, 28.

Links 8 together with associated subordinate nodes 6 are grouped by these segments 27, 28.

For example, FIG. 4 shows that eight subordinate nodes 6 are assigned to segment 28, while twenty-six nodes 6 are assigned to segment 27.

Figure 6:
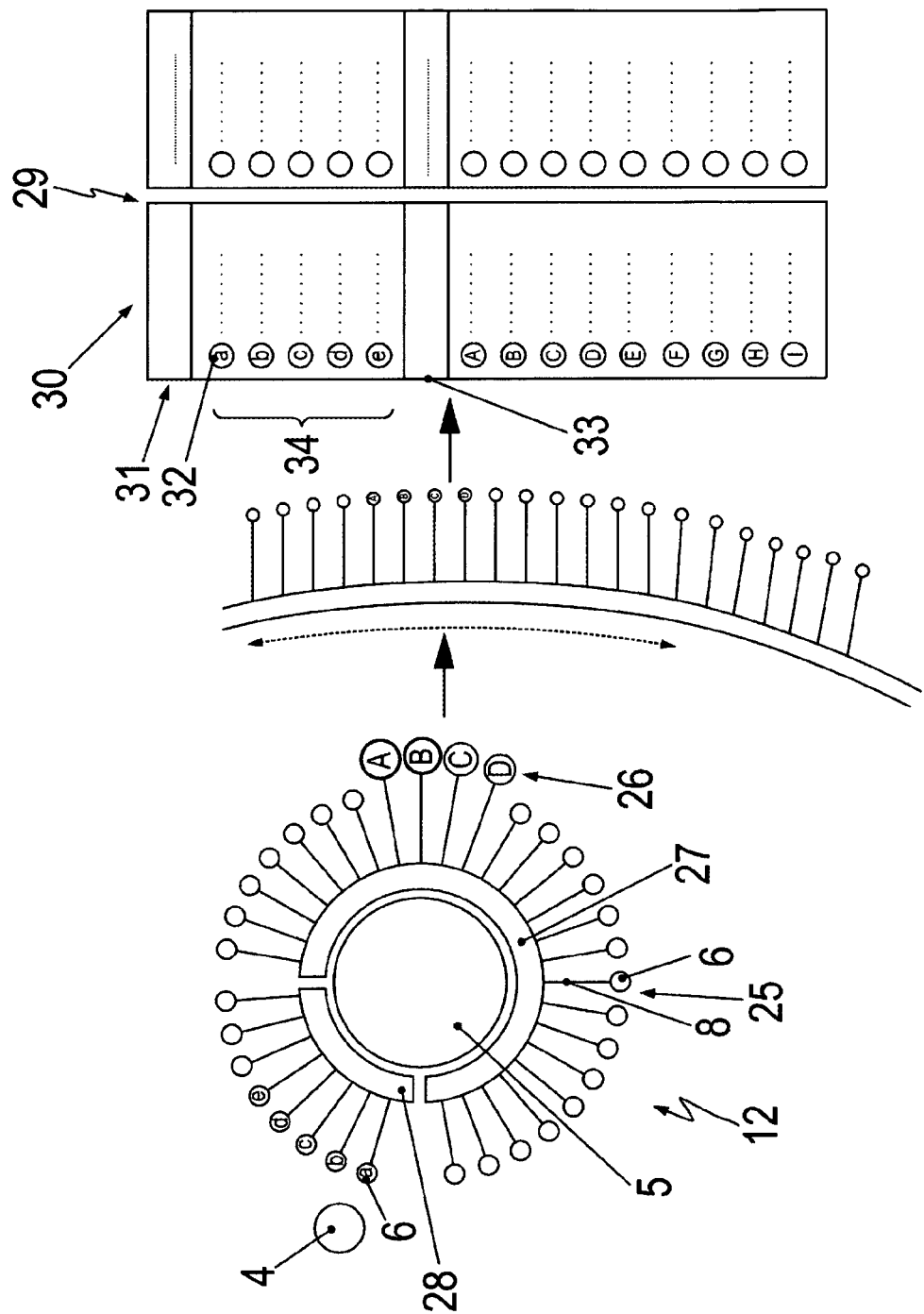
FIG. 6 shows the conversion from a circular placement of the subordinate nodes to a linear display form having lists of list entries in a method according to an example embodiment of the present invention.

Control unit 15 is equipped to change or switch over from expanded display form 12 to a linear display form 29. FIG. 6 shows this change.

A list 30 of list entries 31, 32 and 33 is generated in linear display form 29.

In doing this, list entries 31 and 33 are generated for segments 28 and 27, while list entries 32 (for simplification, only one list entry 32 is denoted) are generated for subordinate nodes 6.

For the purpose of illustrating the correspondence as regards content, the nodes are filled partially with exemplary text contents "a" to "e" or "A" to "D", which are repeated in list entries 32 of linear display form 29.

List entries 32 between list entry 31 for a first segment 28 and a list entry 33 for a second segment 27 form a sublist 34.

Input device 14 has a scrolling device 35, with which each sublist 34, taken by itself, is able to be scrolled such that list entries 31, 33 for adjacent segments 27, 28 in list 30 remain unchanged. As soon as the beginning or the end of sublist 34 is reached during scrolling, a switchover is made by a scroll-mode switchover unit 36 to a second scroll mode, in which list 30 is scrolled as a whole. In this second scroll mode, therefore, not only list entries 32 of sublist 34, but also adjacent list entries 31 and possibly 33 are scrolled, as well.

Preferably, scrolling device 35 is implemented as a scroll wheel of a computer mouse. In this context, scrolling is understood to be movement through a document to make other parts visible, e.g., the shifting of screen contents.

Figure 7:
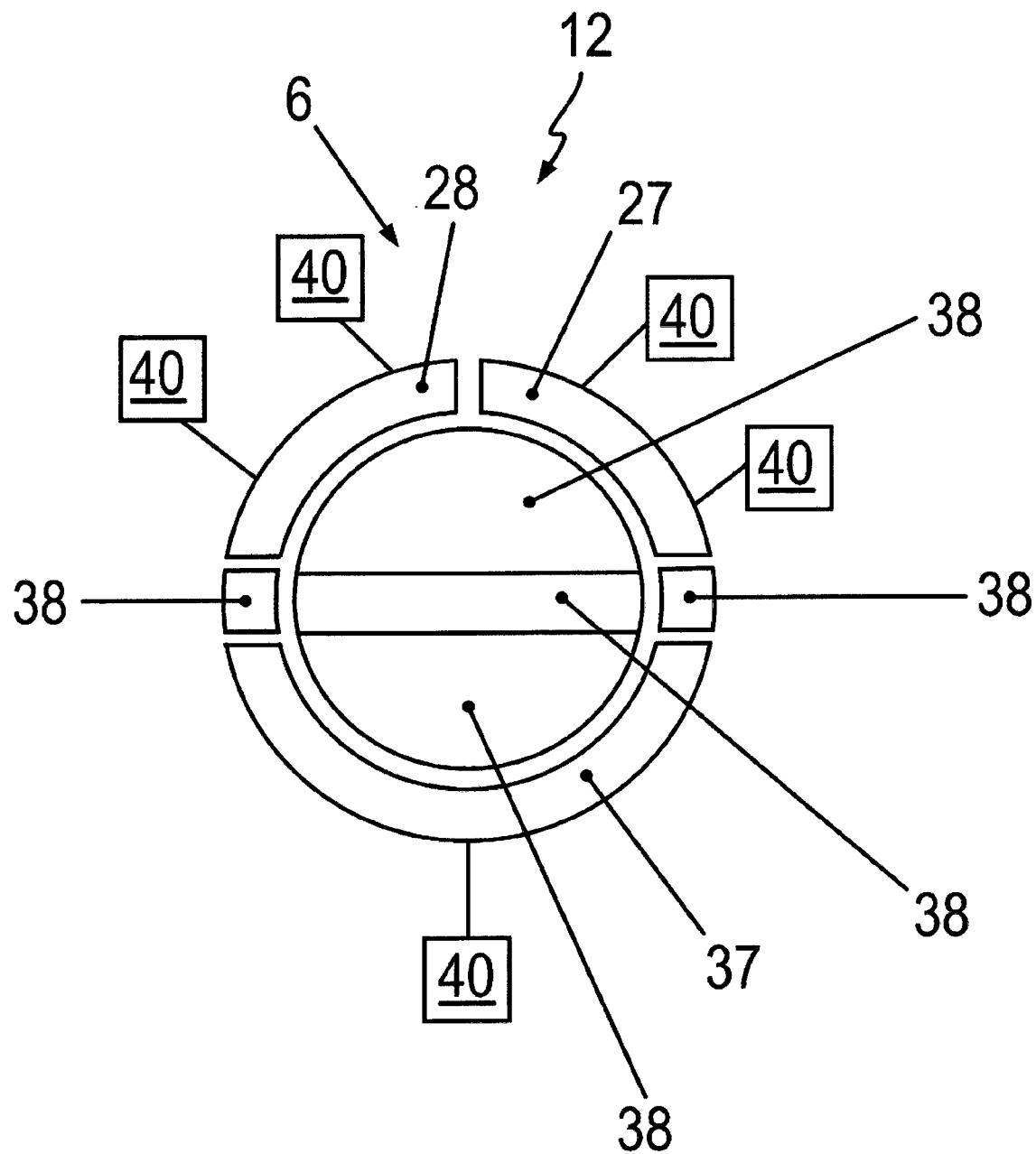
FIG. 7 shows the structuring of the expanded display form of a selected node.

FIG. 7 shows expanded display form 12 in detail, in which the fully available information regarding a node 6 is displayable. End nodes 40 are subordinate to this node 6 and differ in function and display form from remaining nodes 4, 5, 6.

It is clear that in each case, end nodes 40 are linked to a segment 27, 28 and 37, respectively.

Through these segments 27, 28, 37, a thematic organization as regards content is achieved. Thus, segment 27 is provided for the power train of a production plant, segment 28 for interfaces for data communication or for mechanical switching, and segment 37 is provided for functions which are realized at nodes 6. End nodes 40 at segment 28 are assigned to bus systems, storage media, input and output devices, similar data processing devices, etc., whereas end nodes 40 at segment 27 are assigned to motors, gears, sensors, converters, similar units of drive engineering, etc.

More generally, nodes 6 in each case describe devices, directional links 7, 8, 9, 10 representing an order structure in these devices, e.g., an indication as to which device is assigned to which device.

In addition, in node 6 in expanded display form 12, command buttons 38 are formed by which the respective associated device is controllable, parameterizable, readable, or in some other manner operable or manageable. In FIG. 7 in the middle from the top downward, the following command buttons 38 are made available illustratively in node 6: "device properties", "signature", "performance". Located beside them to the right is a command button 38 "tools", and to the left a command button 38 "diagnosis."

To that end, control unit 15 has a control connection to the device assigned to respective node 6.

In the case of navigation apparatus 1, it is provided to display nodes 4, 5, 6, 39 of a navigation tree 3, stored in a storage device 2, in a manner that a selected node 5 is displayed in an expanded display form 12 and further nodes 4, 6 are displayed in a reduced display form 13 on a display unit 11. In response to a selection 16 of a subordinate node 4, 5, 6, 39, previously selected node 5 is converted into a reduced display form 13, and newly selected node 6 is converted into an expanded display form 12.

LIST OF REFERENCE NUMERALS 1 navigation apparatus
2 storage device
3 navigation tree
4, 5, 6 node
7, 8, 9, 10 link
11 display unit
12 expanded display form
13 reduced display form
14 input device
15 control unit
16 selection
17 start node
18 navigation path
19 node
20 link
21 predefined quantity
22 miniaturized display form
23 pointer
24 standard display form
25 diminished display form
26 enlarged display form
27, 28 segment
29 linear display form
30 list
31, 32, 33 list entry
34 sublist
35 scrolling device
36 scroll-mode switchover unit
37 segment
38 command button
39 node
40 end node

What is claimed is:

1. A navigation apparatus, comprising:
a non-transitory storage device adapted to store a navigation tree having nodes, the nodes being interconnected via directional links that define an order structure including superordinate nodes and subordinate nodes for each node;
a display unit adapted to display the nodes at least in an expanded display form and a reduced display form, the reduced display form reproducing decreased information content compared to the expanded display form; and
an input device adapted to select the nodes individually;
wherein the display unit is adapted to, in response to selection of a node:
(a) trigger a conversion of the selected node into the expanded display form; and
(b) automatically convert a node superordinate to the selected node into the reduced display form, the superordinate node being a previously selected node.

2. The navigation apparatus according to claim 1, wherein upon a conversion into the reduced display form, the display unit is adapted to reduce the links, displayed on the display unit with respect to one node, to nodes directly subordinate to the one node, and/or the display unit is adapted to select all links, linked to a selected node, to directly subordinate nodes, and to display the selection on the display unit.

3. The navigation apparatus according to claim 1, wherein the navigation tree includes a start node for which no superordinate node exists, and for each node of the navigation tree, the order structure determines a succession of links by which the node is connected to the start node.

4. The navigation apparatus according to claim 1, wherein a succession of links and associated nodes defines a navigation path, the display unit being adapted to display on the display unit the nodes of the navigation path that are superordinate to a selected node, to hide subordinate nodes that are subordinate to an unselected node of the navigation path and do not belong to the navigation path, and/or to hide links from unselected nodes of the navigation path to subordinate nodes that do not belong to the navigation path.

5. The navigation apparatus according to claim 1, wherein the display unit is adapted to: (a) select nodes and links for display on the display unit, in which branches of the navigation path are eliminated, and display the selection on the display unit; (b) select at least one link for each node displayed, and display the selection on the display unit; and/or (c) select no more than two links for each unselected node to be displayed, the links being linked directly to a respective node, and display the selection on the display unit.

6. The navigation apparatus according to claim 1, wherein (a) the input device includes a pointer and is adapted to select a node by placement of the pointer over a displayed node and subsequent activation, (b) the display unit is adapted to switch over, from a standard display form for all nodes directly subordinate to a node selected and/or displayed in the expanded display form, to a diminished display form when a number of directly subordinate nodes exceeds a threshold value; and/or (c) the display unit is adapted for a tooltip function and/or is adapted to convert a node from a diminished display form to an enlarged display form by placing a pointer over the node.

7. The navigation apparatus according to claim 1, the display unit and/or a counter of the display unit is adapted to ascertain a depth number for the node currently selected and/or a quantity of nodes in the navigation path being displayed, the display unit adapted to automatically convert a predefined quantity of nodes into a miniaturized display form when the quantity of nodes in the navigation path being displayed exceeds a threshold value.

8. The navigation apparatus according to claim 1, wherein:
(a) the display unit is adapted to display the links from one node selected and/or displayed in the expanded display form to all directly subordinate nodes, and to display the directly subordinate nodes and/or the links being grouped by segments of the presently selected node, the links in each case ending at segments, and/or
(b) the display unit is adapted to convert the expanded display form of a node into a linear display form, in which a list entry of a list is generated for each link and for each segment, the list entries of links assigned to one segment in each instance forming a sublist.

9. The navigation apparatus according to claim 8, wherein (a) the list entries for links between two segments and/or a sublist of list entries are scrollable in a first scroll mode for fixed segments, (b) a sublist the list entries for links is scrollable with at least one adjacent list entry for a segment in a second scroll mode, and/or (c) a scroll-mode switchover unit is provided that is adapted to check whether an end of a sublist of list entries of links is reached during scrolling, and is adapted to automatically change from a first scroll mode to a second scroll mode when the result of the check is positive, the at least one adjacent list entry for a segment adjoining the sublist in a direction of a previous scrolling of the sublist.

10. A method for displaying a navigation tree on a display unit, comprising:

interlinking nodes of the navigation tree via directional links, the directional links defining an order structure including superordinate nodes and subordinate nodes for each node, the nodes of the navigation tree being selectable by an input device;

providing an expanded display form and a reduced display form for displaying the nodes of the navigation tree on the display unit, the reduced display form reproducing decreased information content compared to the expanded display form;

displaying at least one superordinate node and at least one subordinate node on the display unit for a selected node;

in response to selection of a node: (a) automatically converting the selected node into the expanded display form, and (b) automatically converting a node superordinate to the selected node into the reduced display form, the superordinate node being a previously selected node.

11. The method according to claim 10, wherein in the reduced display form of a node, fewer links to directly subordinate nodes are displayed on the display unit than in the expanded display form, and/or in the expanded display form of a node, all links to directly subordinate nodes are displayed on the display unit.

12. The method according to claim 10, wherein the navigation tree includes a start node having no superordinate node, for each node of the navigation tree, a succession of links is determined, via which a node is connected to the start node, and/or the succession of links defines a navigation path, and the nodes of the navigation path superordinate to a selected node are displayed on the display unit.

13. The method according to claim 10, wherein (a) nodes that are subordinate to a node displayed in the navigation path of a selected node and which do not belong to the navigation path, and/or links to subordinate nodes that do not belong to the navigation path are hidden, (b) for each node displayed on the display unit, at least one link linked to the node is displayed and/or the navigation path is shown free of branches, by eliminating links in the display, and/or (c) for each unselected node displayed on the display unit, no more than two links directly linked to the node are displayed.

14. The method according to claim 10, wherein (a) to select a node, a pointer of an input device is placed over the node and subsequently activated, (b) placement of the pointer over a node triggers a conversion of the node into an enlarged display form, (c) for all nodes directly subordinate to one node selected and/or displayed in the expanded display form, a switchover is made automatically from a standard display form to a diminished display form when a quantity of directly subordinate nodes exceeds a threshold value, and/or a tooltip function is performed, and/or (d) in the enlarged display form, at least one additional symbol assigned to the node and/or at least one piece of text information assigned to the node is made visible.

15. The method according to claim 10, wherein (a) a predefined quantity of nodes is converted automatically into a miniaturized display form when the quantity of nodes in the navigation path currently being displayed and/or a depth number of the currently selected node exceed a threshold value, (b) links from one node selected and/or displayed in the expanded display form to all directly subordinate nodes, and the directly subordinate nodes are displayed, the links being grouped by segments of the currently selected node, the links ending in each case at the segments, (c) the expanded display form of a node is converted into a linear display form in which a list entry of a list is generated for each link and for each segment, the list entries of links assigned to one segment in each case being grouped in one sublist, (d) a switch is made from a first scroll mode, in which the list entries for links between two segments and/or a sublist of list entries, is scrolled for fixed segments, to a second scroll mode in which the sublist of the list entries for links is scrolled with at least one adjacent list entry for a segment when a beginning or end of a sublist of list entries of links is reached during scrolling, the at least one adjacent list entry for a segment adjoining the sublist in a direction of a previous scrolling of the sublist.

\* \* \* \* \*